United States Patent
Liang et al.

(10) Patent No.: US 10,410,330 B2
(45) Date of Patent: Sep. 10, 2019

(54) SYSTEM AND METHOD FOR COMPARISON-BASED IMAGE QUALITY ASSESSMENT

(71) Applicant: UNIVERSITY OF VIRGINIA PATENT FOUNDATION, Charlottesville, VA (US)

(72) Inventors: Haoyi Liang, Charlottesville, VA (US); Daniel Stuart Weller, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 167 days.

(21) Appl. No.: 15/349,971

(22) Filed: Nov. 11, 2016

(65) Prior Publication Data
US 2017/0140518 A1    May 18, 2017

Related U.S. Application Data

(60) Provisional application No. 62/254,335, filed on Nov. 12, 2015.

(51) Int. Cl.
*G06T 7/00* (2017.01)
*G06T 5/00* (2006.01)
(Continued)

(52) U.S. Cl.
CPC ............ *G06T 7/0002* (2013.01); *G06T 5/001* (2013.01); *G06T 5/50* (2013.01);
(Continued)

(58) Field of Classification Search
None
See application file for complete search history.

(56) References Cited

U.S. PATENT DOCUMENTS

| 7,016,715 B2 | 3/2006 | Stetson |
| 7,688,379 B2 | 3/2010 | Forman et al. |

(Continued)

FOREIGN PATENT DOCUMENTS

| CN | 101282481 A | 10/2008 |
| CN | 101601266 A | 12/2009 |
| DE | 19940879 A1 | 3/2001 |

OTHER PUBLICATIONS

Saha, Ashirbani, and QM Jonathan Wu. "Full-reference image quality assessment by combining global and local distortion measures." arXiv preprint arXiv:1412.5488 (2014). 31 pages (Year: 2014).*

(Continued)

*Primary Examiner* — Ryan P Potts
(74) *Attorney, Agent, or Firm* — Finnegan, Henderson, Farabow, Garrett & Dunner LLP

(57) ABSTRACT

An image quality assessment and restoration system may include a processor and a memory storing instructions to receive an input image, receive a predetermined number of parameter candidates, generate a reconstructed image from the input image for each parameter candidate, sort the reconstructed images by the overall comparative quality between them and determine the best reconstructed image, calculate the overall comparative qualities between the remaining reconstructed images and the best reconstructed image, eliminate any parameter candidates that are suboptimal based on the calculated overall comparative quality, iteratively generate and sort additional reconstructed images and eliminate suboptimal parameter candidates until each of the remaining parameter candidates is converged, and output the converged parameters for use in image restoration. The overall comparative quality may depend upon the local (Continued)

gradient-based structure information and/or the global texture quality information.

20 Claims, 6 Drawing Sheets

(51) Int. Cl.
*G06T 5/50* (2006.01)
*H04L 29/08* (2006.01)
(52) U.S. Cl.
CPC ............... *G06T 2207/20056* (2013.01); *G06T 2207/30168* (2013.01); *H04L 67/10* (2013.01)

(56) References Cited

U.S. PATENT DOCUMENTS

| | | | |
|---|---|---|---|
| 8,996,570 B2 | 3/2015 | Stratman et al. | |
| 2003/0113021 A1* | 6/2003 | Shiotani | G06K 9/036 382/209 |
| 2004/0138538 A1 | 7/2004 | Stetson | |
| 2005/0254727 A1* | 11/2005 | Fedorovskaya | G06T 7/0002 382/286 |
| 2006/0030766 A1 | 2/2006 | Stetson | |
| 2007/0132874 A1 | 6/2007 | Forman et al. | |
| 2009/0141990 A1 | 6/2009 | Pigeon et al. | |
| 2009/0141992 A1 | 6/2009 | Coulombe et al. | |
| 2010/0202700 A1* | 8/2010 | Rezazadeh | G06K 9/6215 382/199 |
| 2011/0033119 A1* | 2/2011 | Rezazadeh | G06K 9/4604 382/199 |
| 2012/0269425 A1* | 10/2012 | Marchesotti | G06K 9/036 382/159 |
| 2012/0269441 A1* | 10/2012 | Marchesotti | G06T 7/0002 382/195 |
| 2012/0281924 A1* | 11/2012 | Coulombe | H04N 19/85 382/218 |
| 2013/0108152 A1* | 5/2013 | Deng | G06T 7/0002 382/159 |
| 2013/0142451 A1* | 6/2013 | Reibman | G06T 7/0002 382/284 |
| 2015/0117763 A1* | 4/2015 | Zhang | G06T 7/0002 382/159 |
| 2016/0358321 A1* | 12/2016 | Xu | G06T 7/0002 |

OTHER PUBLICATIONS

Sheikh, Hamid R., and Alan C. Bovik. "Image information and visual quality." IEEE Transactions on image processing 15.2 (2006): 430-444. 15 pages (Year: 2006).*

Zhu, Xiang, and Peyman Milanfar. "Automatic parameter selection for denoising algorithms using a no-reference measure of image content." IEEE Transactions on image processing 19.12 (2010): 3116-3132. 17 pages (Year: 2010).*

Xue, Wufeng, et al. "Gradient magnitude similarity deviation: A highly efficient perceptual image quality index." IEEE Transactions on Image Processing 23.2 (2014): 684-695. 14 pages (Year: 2013).*

George, Anna Geomi, and Kethsy Prabavathy. "A survey on different approaches used in image quality assessment." Int. J. Comput. Sci. Netw. Sec.(IJCSNS) 14.2 (2014): 78-84. 7 pages (Year: 2014).*

* cited by examiner

SYSTEM AND METHOD FOR COMPARISON-BASED IMAGE QUALITY ASSESSMENT

CROSS REFERENCE TO RELATED APPLICATIONS

This application claims benefit of priority of U.S. Provisional Patent Application No. 62/254,335, filed Nov. 12, 2015, which is incorporated herein by reference.

TECHNICAL FIELD

This disclosure relates generally to the assessment of digital image quality. More specifically, and without limitation, this disclosure relates to comparison-based systems and methods for automatically assessing, comparing, and/or restoring digital image quality.

BACKGROUND

Image post-processes, such as reconstruction, denoising, inpainting, image supperresolution, and low light image enhancement require image quality assessment in order to render a post-processed image with the highest perceptual quality. However, image quality assessment is often time-consuming and expensive when performed by hand. One way to reduce the time and cost required for image quality assessment is to use an image quality assessment algorithm. The strength of an image quality assessment algorithm is measured by its agreement with the human visual system.

The fastest and most accurate image quality assessment algorithms generally use a full-reference or reduced-reference image quality index to select one or more parameters required by the restoration process. Full-reference indices utilize methods such as a mean squared error method, a signal-to-noise ratio method, or a structural similarity index method. However, these algorithms require a reference image, which is not always available.

A reduced-reference image quality index does not require a full reference image but utilizes statistical features from a reference image, such as the power spectrum. Reduced-reference assessment is generally slower and less accurate than full-reference assessment. Moreover, reduced-reference assessment is not possible when statistical features of the reference image are unknown or unavailable.

When no reference image is available, a no-reference image quality index may be used to select one or more parameters required by the restoration process.

The benefit of such an index is that image quality assessment can be performed based on a single distorted image. However, no-reference assessment is generally slower than full-reference or reduced-reference assessment and is generally less accurate than full-reference or reduced-reference assessment. Therefore, there is a need for an assessment algorithm that is fast and accurate but, like traditional no-reference assessment, requires no reference image.

SUMMARY

At present, the speed and accuracy of image quality assessment are limited by existing no-reference methods that evaluate images individually. The disclosed systems and methods utilize a comparison-based approach to image quality assessment, thereby increasing the speed and quality of the assessment without the use of a reference image. Thus, if a distorted image is run through the algorithm, the algorithm will utilize the information available from comparing the input image to other, non-reference distorted images when assessing the quality of the input image. The algorithm would then output one or more parameters that could be utilized for image comparison and/or restoration.

There are many possible applications for such capabilities. Examples of applications include restoration of fluorescence microscopy images, reduction of noise and artifacts in spectroscopy images, reconstruction of MRI images, and reconstruction of radio astronomy images.

Certain embodiments of the present disclosure relate to systems and methods for comparison-based image quality assessment. The use of comparison images overcomes both accuracy and speed limitations in conventional no-reference image quality assessment.

According to an exemplary embodiment of the present disclosure, a system for comparison-based image quality assessment is described. The system may include a processor and a memory storing instructions to receive an input image, receive at least one base image, calculate the overall comparative quality between the input image and each of the at least one base images, and output the calculated overall comparative quality or qualities. The overall comparative quality may depend upon the local gradient-based structure information. The overall comparative quality may further depend upon the global texture quality information.

According to a yet further exemplary embodiment of the present disclosure, a method for performing comparison-based image quality assessment is described. The method includes the steps of receiving an input image, receiving at least one base image, calculating the overall comparative quality between the input image and each of the at least one base images, and outputting the calculated overall comparative quality or qualities. The overall comparative quality may depend upon the local gradient-based structure information. The overall comparative quality may further depend upon the global texture quality information.

Certain embodiments of the present disclosure relate to systems and methods that are adapted to couple parameter trimming with comparison-based image quality assessment. The use of parameter trimming increases the speed of the assessment by discarding parameters that lack potential during the convergence process.

According to a yet further exemplary embodiment of the present disclosure, a system for comparison-based image quality assessment with parameter trimming is described. The system may include a processor and a memory storing instructions to receive an input image, receive a predetermined number of parameter candidates, generate a reconstructed image from the input image for each parameter candidate, sort the reconstructed images by the overall comparative quality between them and determine the best reconstructed image, calculate the overall comparative qualities between the remaining reconstructed images and the best reconstructed image, eliminate any parameter candidates that are suboptimal based on the calculated overall comparative qualities, iteratively generate and sort additional reconstructed images and eliminate suboptimal parameter candidates until each of the remaining parameter candidates is converged, and output the converged parameters for use in image restoration. The overall comparative quality may depend upon the local gradient-based structure information. The overall comparative quality may further depend upon the global texture quality information.

According to a yet further exemplary embodiment of the present disclosure, a method for performing comparison-based image quality assessment with parameter trimming is described. The method includes the steps of receiving an input image, receiving a predetermined number of parameter candidates, generating a reconstructed image from the input image for each parameter candidate, sorting the reconstructed images by the overall comparative quality between them and determining the best reconstructed image, calculating the overall comparative qualities between the remaining reconstructed images and the best reconstructed image, eliminating any parameter candidates that are suboptimal based on the calculated overall comparative quality, iteratively generating and sorting additional reconstructed images and eliminating suboptimal parameter candidates until each of the remaining parameter candidates is converged, and outputting the converged parameters for use in image restoration. The overall comparative quality may depend upon the local gradient-based structure information. The overall comparative quality may further depend upon the global texture quality information.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
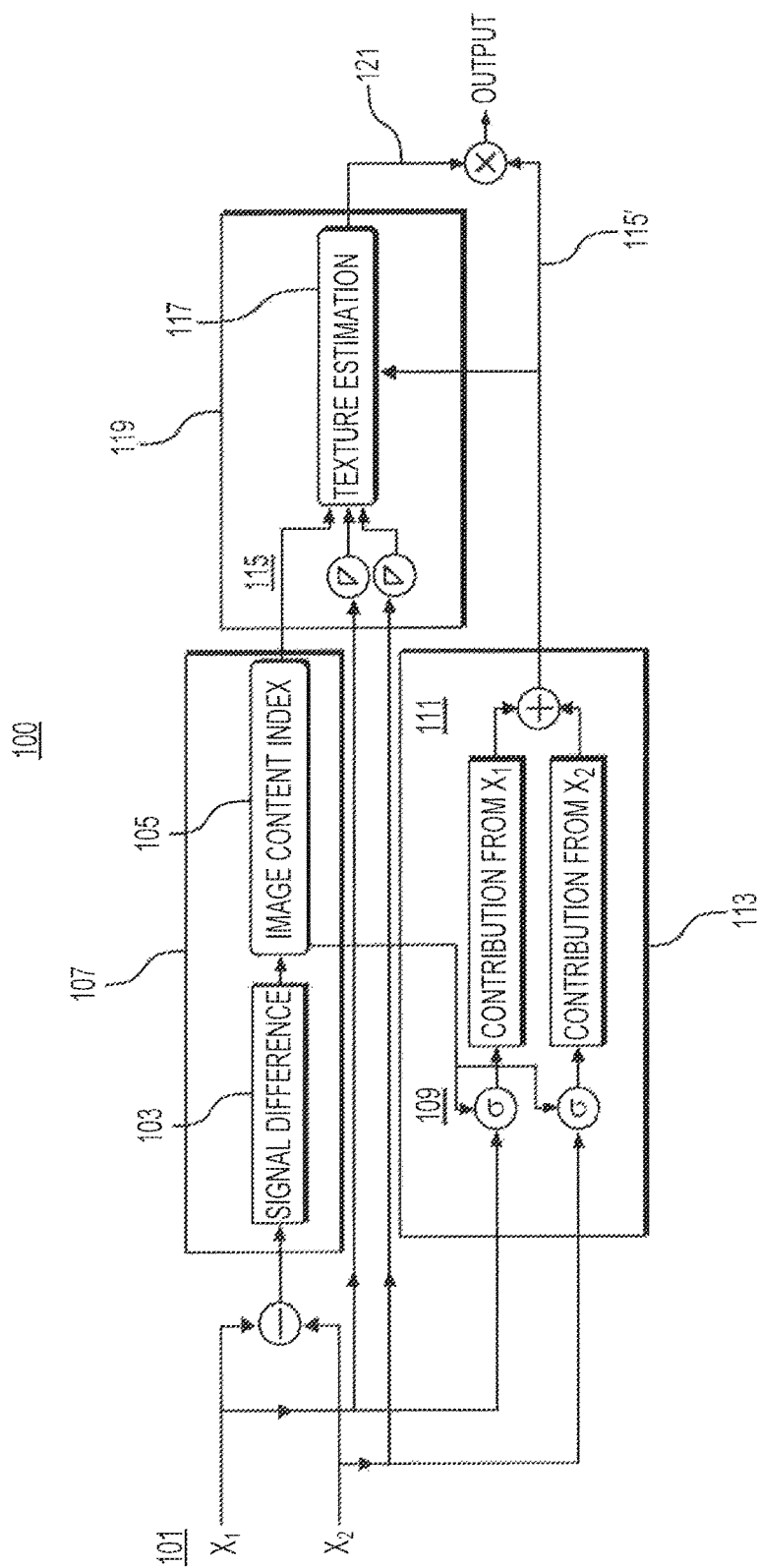
FIG. 1 is a flowchart of an exemplary method for image quality assessment, according to embodiments of the present disclosure.

The disclosed embodiments relate to systems and methods for image quality assessment. Embodiments of the present disclosure may be implemented using a general-purpose computer. Alternatively, a special-purpose computer may be built according to embodiments of the present disclosure using suitable logic elements.

Advantageously, embodiments of the present disclosure allow for assessing the quality of an image with greater speed and accuracy than a traditional no-reference image quality assessment. Additionally, embodiments of the present disclosure allow for assessing the quality of an image without requiring a reference image.

According to an aspect of the present disclosure, a processor may receive an input image, for example, $I_{input}$, and a base image, for example, $I_1$. In some embodiments, the input image may be more distorted than the base image. In other embodiments, the base image may be more distorted than the input image.

According to an aspect of the present disclosure, the processor may divide the input image into a plurality of patches, e.g., $P_{input\_1}$, $P_{input\_2}$, etc. The processor may also divide the base image into a plurality of patches, e.g., $P_1$, $P_2$, etc. In some embodiments, each patch may be of equal size, and each patch from the input image may be matched with a corresponding patch from the base image. For example, $P_{input\_1}$ may correspond to $P_{input\_2}$ may correspond to $P_2$, etc.

According to an aspect of the present disclosure, the processor may determine the plurality of differences, e.g., $D_{p\_1}$, $D_{p\_2}$, etc., between each corresponding group of patches. For example, $D_{p\_1}$ may represent $P_1 - P_{input\_1}$; $D_{p\_2}$ may represent $P_2 - P_{input\_2}$; etc. In some embodiments, the plurality of differences may be indexed by pixel location, e.g., $d_{p\_x\_1}(k)$ may represent the gradient of the $k^{th}$ pixel in the x-direction of $D_{p\_1}$; $d_{p\_y\_1}(k)$ may represent the gradient of the $k^{th}$ pixel in the y-direction of $D_{p\_1}$; etc.

According to an aspect of the present disclosure, the processor may compute the plurality of local gradient matrices from each difference in the plurality of differences. The local gradient matrix, e.g., G, is well-known from MetricQ, a local-approach no-reference image quality assessment algorithm, and may be defined according to Equation 1 below.

$$G_1 = \begin{bmatrix} \vdots & \vdots \\ d_{p\_x\_1}(k) & d_{p\_y\_1}(k) \\ \vdots & \vdots \end{bmatrix} \quad \text{Equation 1}$$

According to an aspect of the present disclosure, the processor may compute the plurality of singular value decompositions (SVD) from each local gradient matrix in the plurality of local gradient matrices. The SVD is well-known from MetricQ, a local-approach no-reference image quality assessment algorithm, and may be defined according to Equation 2 below.

$$SVD(G) = USV^T = U \begin{bmatrix} s_1 & 0 \\ 0 & s_2 \end{bmatrix} [V_1 \; V_2]^T \quad \text{Equation 2}$$

In the example of Equation 2, U and V may be orthonormal matrices. Moreover, $V_1$ may be of size 2×1 and correspond to the dominant direction of the local gradient. Conversely, $V_2$ may be orthogonal to $V_1$ and may represent the edge direction. Furthermore, singular value $s_1$ may represent the luminance variance on $V_1$. Similarly, singular value $s_2$ may represent the luminance variance on $V_2$. For instance, a large value of $s_1$ and a small value of $s_2$ may indicate a prominent edge in the local difference.

According to an aspect of the present disclosure, the processor may compute a plurality of coherence indices, e.g., $C_{ind}$, from the singular values of each singular value decomposition in the plurality of singular value decompositions. The coherence index is well-known from MetricQ, a local-approach no-reference image quality assessment algorithm, and may be defined according to Equation 3 below.

$$C_{ind} = \frac{s_1 - s_2}{s_1 + s_2} \qquad \text{Equation 3}$$

According to an aspect of the present disclosure, the processor may verify if each coherence index in the plurality of coherence indices is above a predetermined threshold level. In some embodiments, each coherence index may be converted to a binary Boolean, e.g., is_stru, depending on whether the coherence index is above the predetermined threshold. A value of true (i.e., +1) may indicate that the compared patches contain primarily meaningful structural differences. Conversely, a value of false (i.e., −1) may indicate that the compared patches contain differences primarily attributable to noise. The plurality of binary Boolean values may comprise an image content index.

According to an aspect of the present disclosure, the processor may compute a first plurality of covariances from the plurality of patches from the input image and a second plurality of covariances from the plurality of patches from the base image. The covariance between two inputs, e.g., $x_1$ and $x_2$, may be defined according to Equation 4 below. In some embodiments, $x_1$ and $x_2$ may be of size n×n. In other embodiments, $x_1$ and $x_2$ may be vectorized and of size $n^2 \times 1$.

$$\text{cov}(x_1, x_2) = \frac{(x_1 - \text{mean}(x_1))^T (x_2 - \text{mean}(x_2))}{n^2 - 1} \qquad \text{Equation 4}$$

For example, the processor may compute the plurality of covariances from the input image as $\text{cov}(P_{input\_1}, D_{p\_1})$; $\text{cov}(P_{input\_2}, D_{p\_2})$; etc. Similarly, the processor may compute the plurality of covariances from the base image as $\text{cov}(P_1\text{-}D_{p\_1})$; $\text{cov}(P_2\text{'-}D_{p\_2})$; etc.

According to an aspect of the present disclosure, the processor may compute the plurality of (unmodified) comparative quality indices, e.g., $C_Q$, from each corresponding group of patches. The comparative quality index may be calculated as the weighted average of the covariances from the corresponding group of patches multiplied by the respective Boolean coherence index. The comparative quality index may be defined according to Equation 5 below.

$$C_Q = \text{is\_struc} \times \frac{\text{cov}(P_{input\_1}, D_{p\_1}) - \text{cov}(P_1, -D_{p\_1})}{M_p} \qquad \text{Equation 5}$$

In the example of Equation 5, $M_p$ may be calculated as the maximum of either the average mean of the corresponding patches or the inverse area of the patches.

According to an aspect of the present disclosure, the processor may compute the (unmodified) overall comparative quality, e.g., CIQA, between the input image and the base image. The (unmodified) overall comparative quality may be calculated as the weighted sum of the plurality of (unmodified) comparative quality indices over the plurality of corresponding groups of patches. The overall comparative quality may be defined according to Equation 6 below.

$$CIQA(I_{input}, I_1) = \frac{1}{M \times N} \sum_{i,j=(\frac{n}{2}):(M-\frac{n}{2})} C_Q(i,j) \qquad \text{Equation 6}$$

In the example of Equation 6, $C_Q(i,j)$ represents the (unmodified) comparative quality index, as defined above, centered at location (i,j). In the example of Equation 6, M×N is the size of the input image (and the base image), and n×n is the size of each local patch.

A positive overall comparative quality may indicate that the input image is of higher quality than the base image. Conversely, a negative overall comparative quality may indicate that the input image is of lower quality than the base image. Moreover, the absolute value of the overall comparative quality may correspond to the magnitude of the difference in quality between the input image and the base image.

According to an aspect of the present disclosure, the processor may compute the plurality of luminance-normalized total variations (i.e., perceived texture complexity) from the Weber-Fechner law from each corresponding group of patches. If the coherence index for a corresponding group of patches is true, the processor may select the maximum between the total variation of the input image and the total variance of the base image. Conversely, if the coherence index for a corresponding group of patches is false, the processor may select the minimum between the total variation of the input image and the total variance of the base image. Advantageously, this may maximize the known correlation between the comparative quality index and the total variation when blurring is present and also minimize the known lack of correlation between the comparative quality index and the total variation when noise is present.

According to an aspect of the present disclosure, the processor may compute the plurality of smoothness indices from each selected total variance in the plurality of selected total variances. The smoothness index, e.g., $S_{ind}$, may be defined according to Equation 7 below.

$$S_{ind} = \log\left(1 + \frac{1}{C_1 \times T_{ind}}\right) \qquad \text{Equation 7}$$

In the example of Equation 7, $C_1$ represents the (unmodified) comparative quality index for the corresponding group of patches, and $T_{ind}$ represents the selected total variation for the corresponding group of patches.

According to an aspect of the present disclosure, the processor may verify whether is_stru equals +1. If so, the processor may set a weight variable equal to +1. If not, the processor may set a weight variable equal to $-S_{ind}$.

According to an aspect of the present disclosure, the processor may compute the plurality of modified comparative quality indices, e.g., $CT_Q$, each weighted by the corresponding selected weight variable. The modified comparative quality index may be defined according to Equation 8 below.

$$CT_Q = C_Q \times \text{weight} \qquad \text{Equation 8}$$

In the example of Equation 8, $C_Q$ represents the (unmodified) comparative quality index as defined above, and weight represents the weight variable previously selected.

According to an aspect of the present disclosure, the processor may compute the modified overall comparative quality between the input image and the base image. The modified overall comparative quality may be calculated as the overall comparative quality CIQA defined above except using the plurality of modified comparative quality indices rather than the plurality of (unmodified) comparative quality indices.

According to an aspect of the present disclosure, the base image may comprise one of a plurality of reconstructed images. The processor may construct the plurality of reconstructed images from the input image. For example, the processor may use (incomplete) Fourier transform data to generate each reconstructed image. The Fourier transform may depend upon one or more parameter candidates. The one or more parameter candidates may exhibit iterative convergence.

Each reconstructed image may be designated $I_m^i$, where m is the label for the parameter candidate used to generate the reconstructed image, and i is the label for the iteration number in the converging calculation.

According to an aspect of the present disclosure, the processor may select the best image, e.g., $I_{best_i}^i$, among the plurality of reconstructed images in a given iteration i. $I_{best_i}^i$ may be defined according to Equation 9 below.

$$CIQA(I_{best_i}^i, I_{best_{i-1}}^i) \geq 0 \text{ and } CIQA(I_{best_i}^i, I_{best_{i+1}}^i) \geq 0 \qquad \text{Equation 9}$$

In some embodiments, CIQA in Equation 9 may represent the (unmodified) overall comparative quality. In other embodiments, CIQA in Equation 9 may represent the modified overall comparative quality.

In some embodiments, the processor may use a bubble sort algorithm to select the best image. Preferably, the bubble sort algorithm may sort according to the (unmodified) overall comparative qualities of the plurality of reconstructed images. Even more preferably, the bubble sort algorithm may sort according to the modified overall comparative qualities of the plurality of reconstructed images.

In other embodiments, the processor may use a modified bubble sort algorithm to select the best image. For example, the modified bubble sort algorithm may instruct the processor to select a plurality of key images from the plurality of reconstructed images in a given iteration i based on the minimum mean squared difference of each reconstructed image as compared to a predetermined threshold. The modified bubble sort algorithm may further select the best key image from the plurality of key images using a traditional bubble sort algorithm. The modified bubble sort algorithm may further select the best image from the plurality of reconstructed images using a traditional bubble sort algorithm comparing images on either side of the best key image. In certain aspects, the traditional bubble sort algorithm may sort according to the (unmodified) overall comparative qualities of the plurality of reconstructed images. In other aspects, the traditional bubble sort algorithm may sort according to the modified overall comparative qualities of the plurality of reconstructed images. Advantageously, the modified bubble sort algorithm avoids comparing adjacent images directly, which may avoid improper sorting caused, for example, by mean squared differences between reconstructed images below the minimum required mean squared difference. A sub-minimal mean squared difference may indicate the lack of a convincing quality comparison, which may further reduce agreement between the sorting algorithm and the human visual system.

According to an aspect of the present disclosure, the processor may compute a reconstructed quality index, e.g., $s_m^i$, for each parameter candidate m in a given iteration i. The reconstructed quality index may be defined according to Equation 10 below.

$$s_m^i = CIQA(I_m^i, I_{best_i}^i) \qquad \text{Equation 10}$$

In some embodiments, CIQA in Equation 10 may represent the (unmodified) overall comparative quality. In other embodiments, CIQA in Equation 10 may represent the modified overall comparative quality.

According to an aspect of the present disclosure, the processor may compute a quality increasing gradient index, e.g., $g_m^i$, for each parameter candidate m in a given iteration i. The reconstructed quality index may be defined according to Equation 11 below.

$$g_m^i = CIQA(I_m^i, I_{best_{i-1}}^{i-1}) - CIQA(I_m^{i-1}, I_{best_{i-1}}^{i-1}) \qquad \text{Equation 11}$$

In some embodiments, CIQA in Equation 11 may represent the (unmodified) overall comparative quality. In other embodiments, CIQA in Equation 11 may represent the modified overall comparative quality.

According to an aspect of the present disclosure, the processor may compute a quality prediction index, e.g., $p_m^i$, for each parameter candidate m in a given iteration i. The quality prediction index may be defined according to Equation 12 below.

$$p_m^i = s_m^i + \text{pre}_{len} \times g_m^i \qquad \text{Equation 12}$$

In the example of Equation 12, $\text{pre}_{len}$ is a preset integer and may represent the predicting length in iterations. For example, $\text{pre}_{len}$ may be set equal to four.

According to an aspect of the present disclosure, the processor may determine whether the quality prediction index for parameter candidate m remains positive or negative over a sufficient number of iterations. If so, the processor may disregard parameter candidate m prior to convergence. If not, the processor may continue to include parameter candidate m in future iterations. The processor may perform such a determination for the plurality of parameter candidates and throughout the plurality of iterations. Advantageously, this procedure may increase the speed of the reconstruction calculation by eliminating suboptimal parameter candidates prior to convergence.

According to an aspect of the present disclosure, the processor may also determine whether the global texture quality prediction for parameter candidate m remains positive or negative over a sufficient number of iterations. The global texture quality prediction may depend upon the distributions of natural scene statistics in each image. If the global texture quality prediction for parameter candidate m remains positive or negative over a sufficient number of iterations, the processor may disregard parameter candidate m prior to convergence. If not, the processor may continue to include parameter candidate m in future iterations, even if the quality prediction index for parameter candidate m remains positive or negative over a sufficient number of iterations. Advantageously, this integration of global texture information with the local gradient information may improve the accuracy of the reconstruction calculation.

Reference will now be made in detail to exemplary embodiments and aspects of the present disclosure, examples of which are illustrated in the accompanying drawings.

FIG. 1 is a flowchart of exemplary method 100 for image quality assessment. Method 100 may be implemented using a general-purpose computer. Alternatively, a special-purpose computer may be built for implementing method 100 using suitable logic elements.

At step 101, the system receives two signals, e.g., $x_1$ and $x_2$. For example, the input signals may be of equal size. In some instances, signals $x_1$ and $x_2$ may comprise images. In other instances, signals $x_1$ and $x_2$ may comprise patches derived from images. For example, signal $x_1$ may comprise a selected patch from one image and signal $x_2$ may comprise a selected patch from a second image.

At step 103, the system calculates the difference between the input signals. In some instances, the system may repeat steps 101 and 103 to calculate a plurality of differences. For example, steps 101 and 103 may be performed for a plurality of pairs of patches, each pair including one patch from one image and a second patch from a second image.

At step 105, the system calculates the image content index. For example, the system may calculate the local gradient matrix based on the difference calculated in step 103 and may calculate the image content index from the coherence index based on the singular value decomposition of the local gradient matrix. In some instances, the system may repeat step 105 to calculate a plurality of image content indices. For example, step 105 may be performed for a plurality of differences.

Steps 101, 103, and 105 may comprise a single content detection module 107. In some instances, content detection module 107 may be implemented together with the other modules disclosed below. In other instances, content detection module 107 may be implemented separately from one or more of the other modules disclosed below. For example, content detection module 107 may output the one or more image content indices for further use in the modules disclosed below.

At step 109, the system calculates the covariance for each of the input signals. In some instances, the system may receive the input signals directly from the content detection module. In other instances, the system may receive the input signals separately from the content detection module.

At step 111, the system calculates the (unmodified) comparative quality index for the input signals. For example, the system may calculate the (unmodified) comparative quality index based on the covariances calculated in step 109 and the image content index from the content detection module. In some instances, the system may receive the image content index directly from the content detection module. In other instances, the system may receive the image content index separately from the content detection module. In some instances, the system may repeat step 111 to calculate a plurality of (unmodified) comparative quality indices.

Steps 109 and 111 may comprise a single contribution module 113. In some instances, contribution module 113 may be implemented together with the other modules disclosed above and below. In other instances, contribution module 113 may be implemented separately from one or more of the other modules disclosed above and below. For example, contribution module 113 may receive the output from content detection module 107 separately from the input signals and may output the one or more (unmodified) comparative quality indices for further use in the module disclosed below.

At step 115', the system calculates and outputs the (unmodified) overall comparative quality. For example, the system may calculate the overall comparative quality based on the weighted sum of the (unmodified) comparative quality indices calculated in step 111. In some instances, the system may receive the comparative quality indices directly from contribution module 113. In other instances, the system may receive the comparative quality indices separately from contribution module 113.

In some instances, step 115' may be implemented together with the other modules disclosed above. In other instances, step 115' may be implemented separately from one or more of the other modules disclosed above. For example, the system may receive the output from contribution module 113 separately from the input signals.

Alternatively, at step 115, the system calculates the smoothness index. For example, the system may calculate the smoothness index based on the (unmodified) comparative quality index calculated in step 111 and the luminance-normalized total variation. In some instances, the system may receive the comparative quality index directly from contribution module 113. In other instances, the system may receive the comparative quality index separately from contribution module 113. In some instances, the system may repeat step 115 to calculate a plurality of smoothness indices.

At step 117, the system calculates the modified comparative quality index for the input signals. In some instances, the system may calculate the modified comparative quality index based on the smoothness index calculated in step 115 and the (unmodified) comparative quality index from contribution module 113. In other instances, the system may calculate the modified comparative quality index based on the smoothness index calculated in step 115, the covariances calculated in step 109, and the image content index from content detection module 107. In some instances, the system may receive the (unmodified) comparative quality index or the covariances directly from contribution module 113. In other instances, the system may receive the (unmodified) comparative quality index or the covariances separately from contribution module 113. In some instances, the system may receive the image content index directly from content detection module 107. In other instances, the system may receive the image content index separately from content detection module 107. In some instances, the system may repeat step 117 to calculate a plurality of modified comparative quality indices.

Steps 115 and 117 may comprise a single texture compensation module 119. In some instances, texture compensation module 119 may be implemented together with the other modules disclosed above. In other instances, texture compensation module 119 may be implemented separately from one or more of the other modules disclosed above. For example, the system may receive the output from contribution module 113 separately from the input signals.

At step 121, the system calculates and outputs the modified overall comparative quality. For example, the system may calculate the modified overall comparative quality based on the weighted sum of the modified comparative quality indices calculated in step 117.

Figure 2:
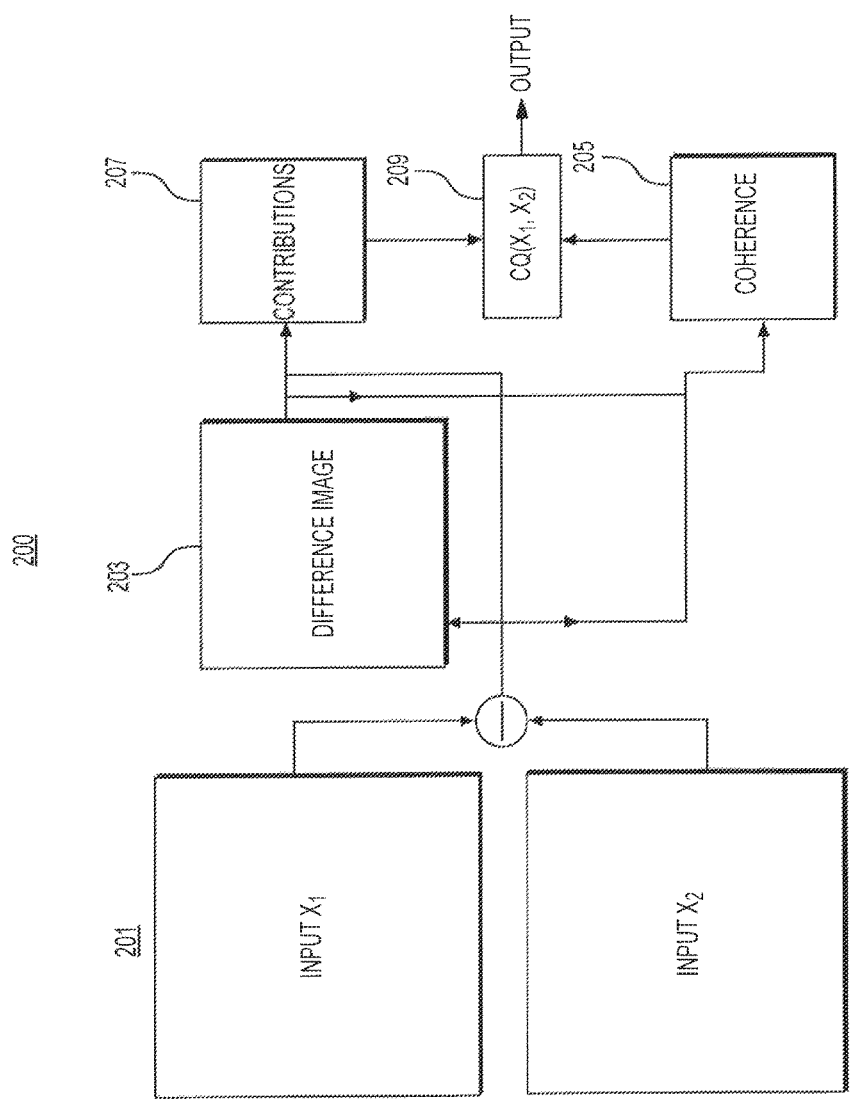
FIG. 2 is a flowchart of an exemplary method for calculating the (unmodified) comparative quality index, according to embodiments of the present disclosure.

FIG. 2 is a flowchart of exemplary method 200 for calculating the (unmodified) comparative quality index. Method 200 may be implemented using a general-purpose computer. Alternatively, a special-purpose computer may be built for implementing method 200 using suitable logic elements. Method 200 may be implemented in conjunction with method 100 or separately.

At step 201, the system receives two signals, e.g., $x_1$ and $x_2$. For example, the input signals may be of equal size. In some instances, signals $x_1$ and $x_2$ may comprise images. In other instances, signals $x_1$ and $x_2$ may comprise patches derived from images. For example, signal $x_1$ may comprise a selected patch from one image and signal $x_2$ may comprise a selected patch from a second image.

At step 203, the system calculates the difference between the input signals. In some instances, the system may directly calculate the difference between the input signals. In other instances, the system may vectorize the input signals before calculating the difference between them.

At step 205, the system calculates the image content index for each of the input signals. For example, the system may calculate the local gradient matrix based on the difference calculated in step 203 and may calculate the image content index from the coherence index based on the singular value decomposition of the local gradient matrix.

At step 207, the system calculates the covariance for each of the input signals. The covariance may indicate the contribution to the difference from each of the input signals.

At step 209, the system calculates and outputs the (unmodified) comparative quality index. The (unmodified) comparative quality index may comprise the weighted sum of the contributions from step 207, and the weight in the sum may be based on the image content index from step 205.

Figure 3:
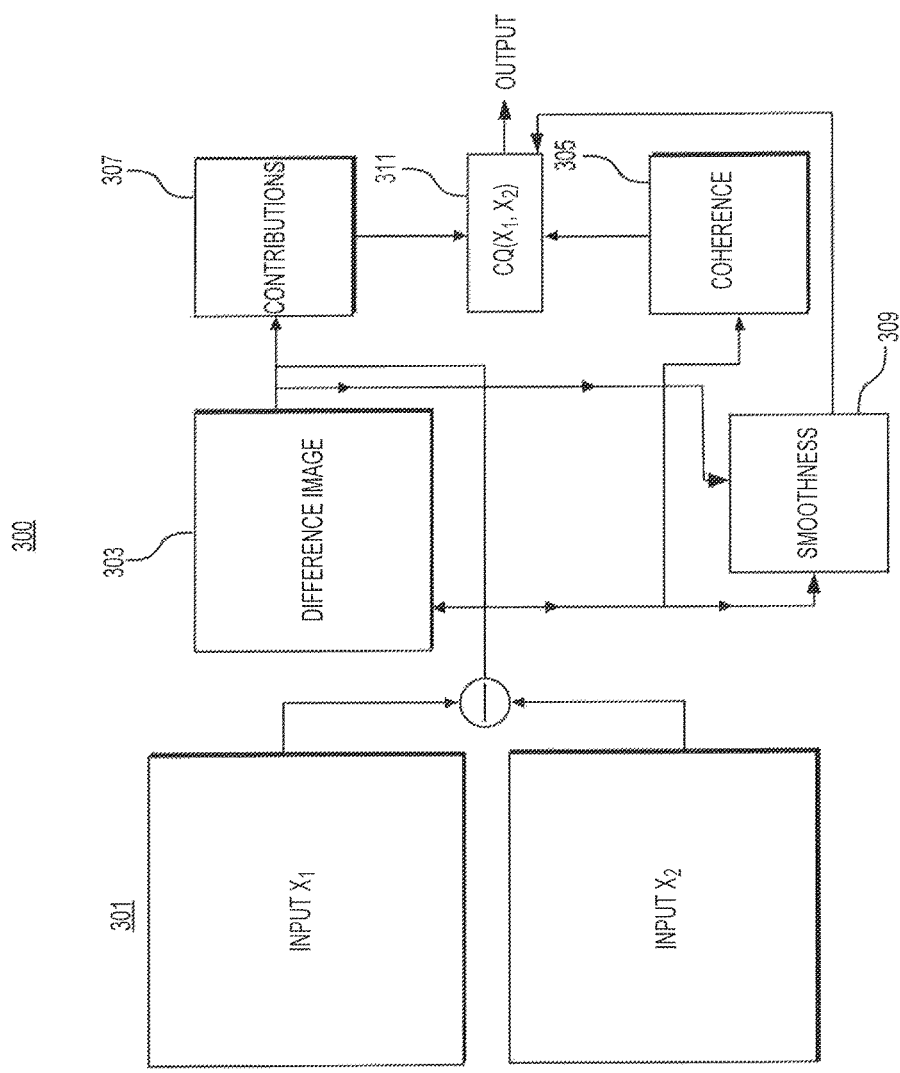
FIG. 3 is a flowchart of an exemplary method for calculating the modified comparative quality index, according to embodiments of the present disclosure.

FIG. 3 is a flowchart of exemplary method 300 for calculating the modified comparative quality index. Method 300 may be implemented using a general-purpose computer. Alternatively, a special-purpose computer may be built for implementing method 300 using suitable logic elements. Method 300 may be implemented in conjunction with methods 100 and/or 200, or separately.

At step 301, the system receives two signals, e.g., $x_1$ and $x_2$. For example, the input signals may be of equal size. In some instances, signals $x_1$ and $x_2$ may comprise images. In other instances, signals $x_1$ and $x_2$ may comprise patches derived from images. For example, signal $x_1$ may comprise a selected patch from one image and signal $x_2$ may comprise a selected patch from a second image.

At step 303, the system calculates the difference between the input signals. In some instances, the system may directly calculate the difference between the input signals. In other instances, the system may vectorize the input signals before calculating the difference between them.

At step 305, the system calculates the image content index for each of the input signals. For example, the system may calculate the local gradient matrix based on the difference calculated in step 303 and may calculate the image content index from the coherence index based on the singular value decomposition of the local gradient matrix.

At step 307, the system calculates the covariance for each of the input signals. The covariance may indicate the contribution to the difference from each of the input signals.

At step 309, the system calculates the smoothness index. The smoothness index may comprise the logarithm of the inverse of the luminance-normalized total variation and the weighted sum of the contributions from step 307. The weight in the sum may be based on the image content index from step 305.

At step 311, the system calculates and outputs the modified comparative quality index. The modified comparative quality index may comprise the weighted sum of the contributions from step 307, and the weight in the sum may be based on the image content index from step 305 and the smoothness index from step 309.

Figure 4:
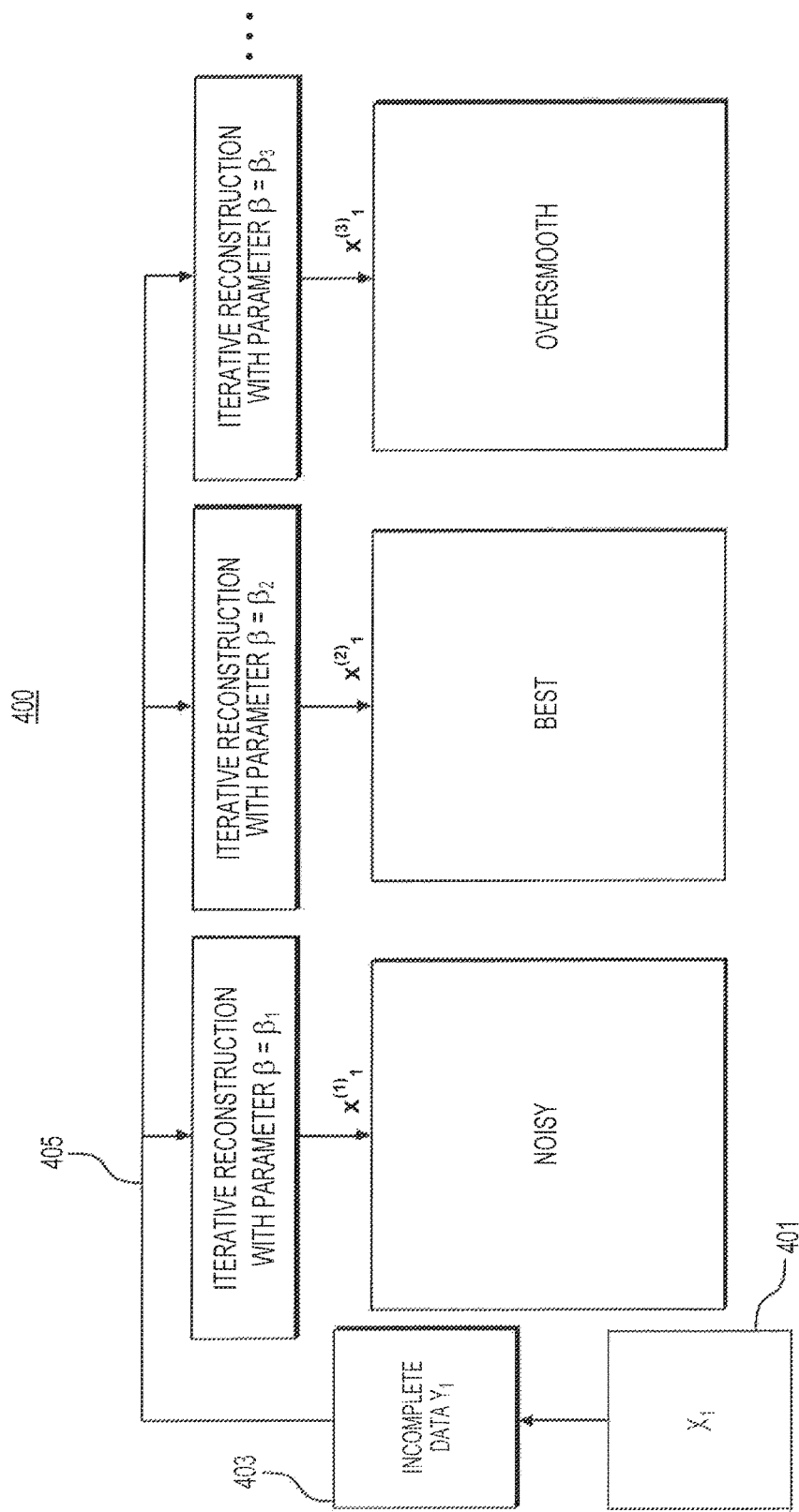
FIG. 4 is a flowchart of an exemplary method for image reconstruction, according to embodiments of the present disclosure.

FIG. 4 is a flowchart of exemplary method 400 for reconstructing an image. Method 400 may be implemented using a general-purpose computer. Alternatively, a special-purpose computer may be built for implementing method 400 using suitable logic elements. Method 400 may be implemented in conjunction with methods 100, 200, and/or 300, or separately.

At step 401, the system receives a signal, e.g., $x_1$. In some instances, signal $x_1$ may comprise an image. In other instances, signal $x_1$ may comprise a portion of an image.

At step 403, the system calculates an incomplete Fourier transform measurement, e.g., $y_1$, from the input signal. The measurement may require selection of one or more regularization parameters, e.g., $\beta$.

At step 405, the system calculates a plurality of variation reconstructions, e.g., $x^{(1)}_1$, $x^{(2)}_1$, $x^{(3)}_1$, etc., from a plurality of choices for the one or more regularization parameters, e.g., $\beta_1$, $\beta_2$, $\beta_3$, etc. Preferably, the system outputs the best reconstructed image from the plurality of reconstructed images. In the example of FIG. 4, reconstruction $x^{(2)}_1$ is labeled as the best reconstructed image.

Figure 5:
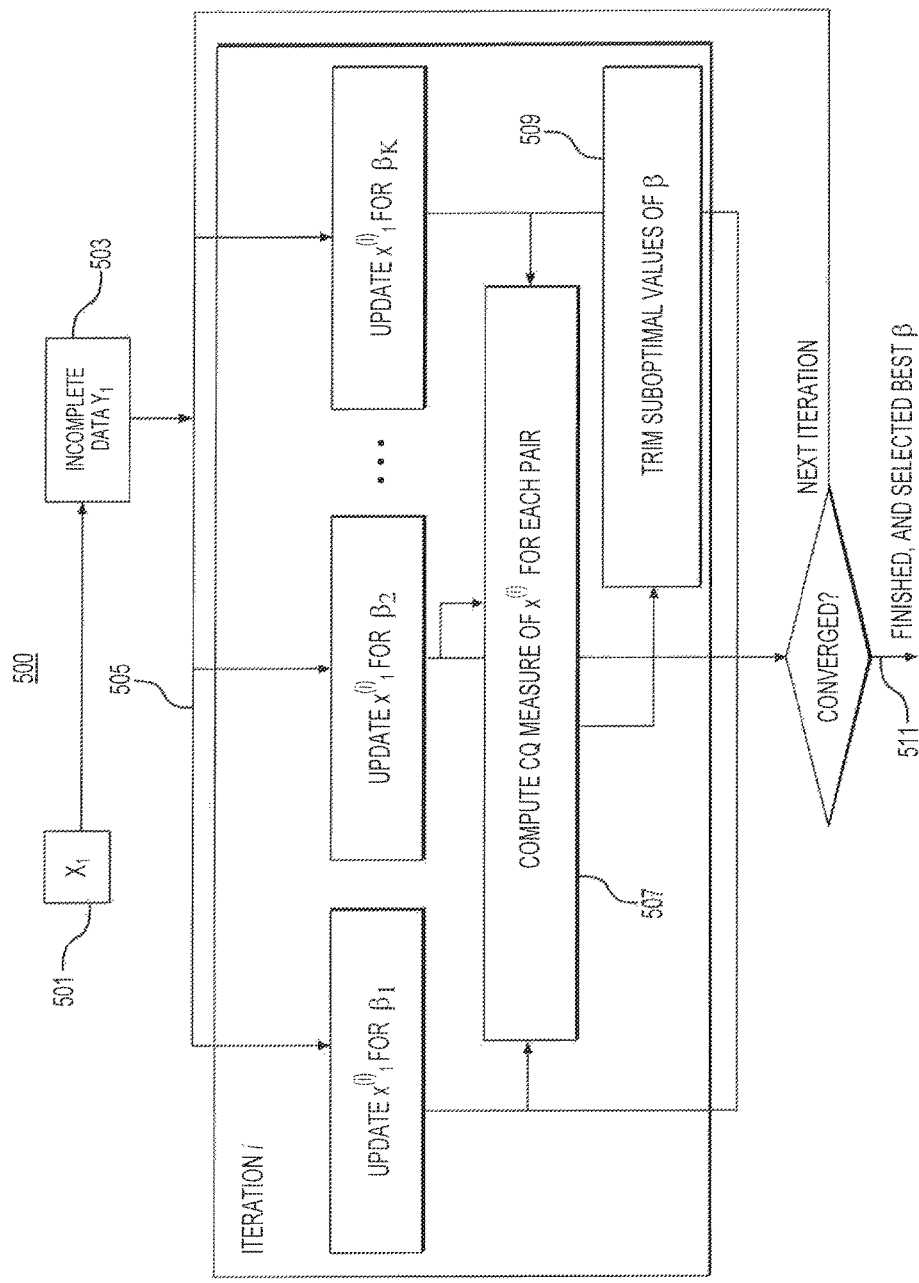
FIG. 5 is a flowchart of an exemplary method for parameter trimming, according to embodiments of the present disclosure.

FIG. 5 is a flowchart of exemplary method 500 for converging the one or more regularization parameters used in image reconstruction. Method 500 may be implemented using a general-purpose computer. Alternatively, a special-purpose computer may be built for implementing method 500 using suitable logic elements. Method 300 may be implemented in conjunction with methods 100, 200, 300, and/or 400, or separately.

At step 501, the system receives a signal, e.g., $x_1$. In some instances, signal $x_1$ may comprise an image. In other instances, signal $x_1$ may comprise a portion of an image.

At step 503, the system calculates an incomplete Fourier transform measurement from the input signal. The measurement may require selection of one or more regularization parameters, e.g., $\beta_1$, $\beta_2$, $\beta_3$, etc.

At step 505, the system calculates a plurality of variation reconstructions, e.g., $x^{(1)}_1$, $x^{(2)}_1$, $x^{(3)}_1$, etc., from a plurality of choices for the one or more regularization parameters.

At step 507, the system sorts the reconstructed images from step 505 based on the quality of the plurality of pairs of the reconstructed images. In some instances, the system may use a bubble sort algorithm to sort the images. In other instances, the system may use a modified bubble sort algorithm to sort the images. The modified bubble sort algorithm may select a plurality of key images from the plurality of reconstructed images and perform the quality comparisons between the plurality of key images and the remaining plurality of reconstructed images. In some instances, the comparison may depend upon the (unmodified) overall comparative quality. In other instances, the comparison may depend upon the modified overall comparative quality.

At step 509, the system eliminates suboptimal values of the selections of the one or more regularization parameters. For example, the system may calculate a quality prediction index for each of the selections of the one or more regularization parameters and eliminate any selections whose quality prediction index remains positive or negative over a sufficient number of iterations. In some instances, the system may further calculate a global texture quality prediction for each of the selections of the one or more regularization parameters and eliminate any selections whose global texture quality prediction remains positive or negative over a sufficient number of iterations.

Steps 505, 507, and 509 may be repeated over a plurality of iterations, e.g., i. For example, the system may adjust the choices for the one or more regularization parameters based on the quality prediction indices of the previous iteration.

At step 511, the system outputs the converged values of the selections of the one or more regularization parameters.

Figure 6:
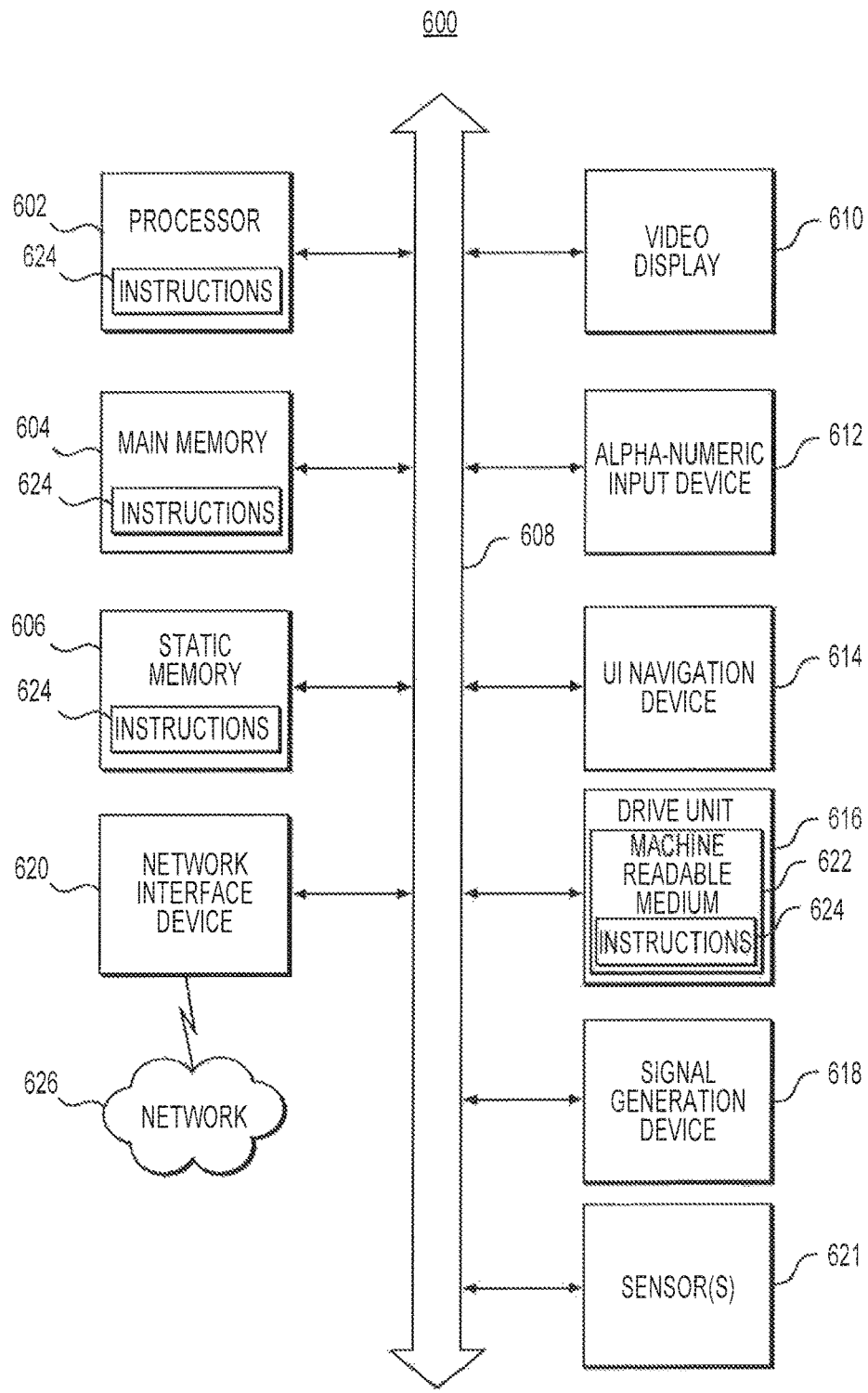
FIG. 6 is a schematic representation of a system for implementing the methods of FIG. 1, FIG. 2, FIG. 3, FIG. 4, and/or FIG. 5, according to embodiments of the present disclosure.

FIG. 6 is a schematic representation of an exemplary system 600 for implementing any of the methods described above in FIGS. 1-5, either separately or in combination. Examples of system 600 may include one or more logic components, or one or more circuits (e.g., modules). Circuits are tangible entities configured to perform certain operations and may be arranged (e.g., internally or with respect to external entities such as other circuits) in a specified manner. For example, one or more computer systems (e.g., a standalone, client or server computer system) or one or more hardware processors (processors) can be configured by software (e.g., instructions, an application portion, or an application) as a circuit that operates to perform certain operations as described herein. The software may reside, for example, on a non-transitory machine readable medium or in a transmission signal. The software, when executed by the underlying hardware of the circuit, may cause the circuit to perform the certain operations.

A circuit may be implemented mechanically or electronically. For example, a circuit may comprise dedicated circuitry or logic that is specifically configured to perform one or more techniques discussed above, such as including a special-purpose processor, a field programmable gate array (FPGA) or an application-specific integrated circuit (ASIC). A circuit may further comprise programmable logic (e.g., circuitry, as encompassed within a general-purpose processor or other programmable processor) that can be temporarily configured (e.g., by software) to perform the certain operations. Implementing a circuit mechanically (e.g., in dedicated and permanently configured circuitry), or in temporarily configured circuitry (e.g., configured by software) may impact time and monetary costs.

Given a plurality of temporarily configured circuits, each of the circuits may be configured or instantiated at varying instances in time. For example, given a plurality of circuits comprising a general-purpose processor configured via software, the general-purpose processor may be configured as respective different circuits at different times. Software may configure a processor to constitute a particular circuit at one instance of time and to constitute a different circuit at a different instance of time.

One or more circuits may provide information to, and receive information from, one or more other circuits. In the example of FIG. 6, the circuits may be regarded as communicatively coupled to one or more other circuits. Communications between circuits may be achieved through signal transmission (e.g., over appropriate circuits and buses that connect the circuits). In embodiments in which multiple circuits are configured or instantiated at varying times, the circuits may communicate, for example, using the storage and retrieval of information in memory structures to which the multiple circuits have access. For example, one circuit may perform a first operation and store the output of the first operation in a memory device to which it is communicatively coupled. Similarly, a second circuit may, at a later time, access the memory device to retrieve the stored output and perform a second operation therefrom. Circuits may be configured to initiate or receive communications with input or output devices and may operate on a resource (e.g., a collection of information).

The various operations of one or more of the exemplary methods described above by reference to FIGS. 1-5 may be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions.

Similarly, one or more of the exemplary methods described above by reference to FIGS. 1-5 may be at least partially processor-implemented. For example, at least some of the operations of one or more of the methods may be performed by one or processors or processor-implemented circuits. The performance of certain of the operations may be distributed among the one or more processors, not only residing within a single machine, but deployed across a number of machines. For example, the processor or processors may be located in a single location (e.g., within a home environment, an office environment or as a server farm) or may be distributed across a number of locations.

The one or more processors may further operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs)).

The exemplary embodiments disclosed above may be implemented in digital electronic circuitry, in computer hardware, in firmware, in software, or in any combination thereof. The exemplary embodiments disclosed above may further be implemented using a computer program product (e.g., a computer program, tangibly embodied in an information carrier or in a machine readable medium, for execution by, or to control the operation of, data processing apparatus such as a programmable processor, a computer, or multiple computers).

A computer program may be written in any form of programming language, including compiled or interpreted languages, and it may be deployed in any form, including as a stand-alone program or as a software module, subroutine, or other unit suitable for use in a computing environment. A computer program may be deployed to be executed on one computer or on multiple computers at one site or distributed across multiple sites and interconnected by a communication network.

For example, operations may be performed by one or more programmable processors executing a computer program to perform functions by operating on input data and generating output. Operations may further be performed by special purpose logic circuitry (e.g., a field programmable gate array (FPGA) or an application-specific integrated circuit (ASIC)).

A computing system may include one or more clients and one or more servers. The one or more clients and one or more servers may be remote from each other and may interact through a communication network. The relationship of client and server arises by virtue of computer programs running on the respective computers and having a client-server relationship to each other. In embodiments deploying a programmable computing system, certain functionality may be implemented in permanently configured hardware (e.g., an ASIC), in temporarily configured hardware (e.g., a combination of software and a programmable processor), or in a combination of permanently and temporarily configured hardware. Exemplary system 600 includes both hardware and software architectures.

In some embodiments, system 600 may operate as a standalone device. In other embodiments, system 600 may be connected (e.g., networked) to other machines. In certain aspects, system 600 may operate in the capacity of either a server or a client machine in server-client network environments. In other aspects, system 600 may operate as a peer machine in peer-to-peer (or other distributed) network environments.

In some embodiments, system 600 may comprise a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed). In other embodiments, system 600 may comprise a collection of machines that individually or jointly execute a set (or multiple sets) of instructions to perform any one or more of the methodologies discussed herein.

In the example of FIG. 6, system (e.g., computer system) 600 may include processor 602 (e.g., a central processing unit (CPU), a graphics processing unit (GPU), or both), main memory 604, and static memory 606. Processor 602, main memory 604, static memory 606, or any combination thereof may communicate with each other via bus 608. System 600 may further include display unit 610, alphanumeric input device 612 (e.g., a keyboard), and user interface (UI) navigation device 611 (e.g., a mouse). In some embodiments, display unit 610, input device 612, and UI navigation device 614 may comprise a touch screen display.

System 600 may further include storage device 616 (e.g., drive unit), signal generation device 618 (e.g., a speaker), network interface device 620, and one or more sensors, e.g., sensor 621. In some embodiments, the one or more sensors may comprise a global positioning system (GPS) sensor, compass, accelerometer, or other sensor. Storage device 616 may include machine-readable medium 622. In some embodiments, medium 622 may store one or more sets of data structures or instructions, e.g., instructions 624. In certain aspects, main memory 604 may also store, at least in part, instructions 624. In certain aspects, static memory 606 may also store, at least in part, instructions 624. In certain aspects, processor 602 may also store, at least in part, instructions 624, for example, during execution thereof by system 600. Processor 602, main memory 604, static memory 606, storage device 616, or any combination thereof, may comprise machine-readable media.

Medium 622 may further include multiple media (e.g., a centralized or distributed database, and/or associated caches and servers) adapted to store the one or more instructions, e.g., instructions 624. Medium 622 may further include, for example, one or more solid-state memories, optical or magnetic media, semiconductor memory devices (e.g., Electrically Programmable Read-Only Memory (EPROM), Electrically Erasable Programmable Read-Only Memory (EEPROM)), flash memory devices, magnetic disks such as internal hard disks and removable disks; magnetooptical disks, CD-ROM and DVD-ROM disks, etc.

In some embodiments, instructions 624 may be transmitted or received over communications network 626 using a transmission medium. Network interface device 620 may use any one of a number of transfer protocols (e.g., frame relay, IP, TCP, UDP, HTTP, etc.) over the transmission medium. Communication network 626 may include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 standards family known as Wi-Fi®, IEEE 802.16 standards family known as WiMax®), peer-to-peer (P2P) networks, etc.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for automatically assessing and comparing quality of digital images, comprising:
 a memory storing instructions; and
 a processor configured to execute the instructions to:
  receive an input image;
  receive a plurality of base images;
  select at least one key image from the plurality of base images based on a minimum mean squared difference of each base image as compared to a predetermined threshold;
  calculate overall comparative qualities between pairs of the input image and the at least one key image, the overall comparative qualities representing a weighted combination of comparative quality indices;
  sort the input image and at least one key image by the overall comparative qualities between the pairs and determine the best key image, the best key image being a key image sorted highest by the overall comparative qualities; and output at least one of: the best key image as sorted by overall comparative quality or the overall comparative qualities,
wherein overall comparative quality depends upon local gradient-based structure information, and the local gradient-based structure information depends upon differences between images being compared.

2. A system for automatically assessing and restoring quality of a digital image, comprising:
a memory storing instructions; and
a processor configured to execute the instructions to:
receive an input image;
receive a predetermined number of parameter candidates;
generate a reconstructed image from the input image for each parameter candidate;
sort the reconstructed images by overall comparative qualities between pairs of the reconstructed images in the sorting, the overall comparative qualities representing a weighted combination of comparative quality indices, and determine the best reconstructed image, the best reconstructed image being a reconstructed image sorted highest by the overall comparative qualities;
calculate the overall comparative qualities between each remaining reconstructed image and the best reconstructed image;
eliminate any parameter candidates that are suboptimal based on the calculated overall comparative quality;
iteratively generate and sort additional reconstructed images and eliminate suboptimal parameter candidates until each of the remaining parameter candidates is converged; and
output at least one of: the converged parameter candidates for use in image restoration or one or more reconstructed images whose parameter candidates converged,
wherein overall comparative quality depends upon local gradient-based structure information, and the local gradient-based structure information depends upon differences between images being compared.

3. The system of claim 1 or 2, further comprising:
a plurality of processors; and
a plurality of memories,
wherein the plurality of processors and the plurality of memories are adapted to execute the instructions in a cloud computing environment.

4. The system of claim 1 or 2, further comprising:
a network interface device,
wherein the interface device receives, at least in part, the instructions.

5. The system of claim 4, wherein the interface device transmits, at least in part, the output.

6. The system of claim 1 or 2, wherein the memory includes a static memory and a main memory.

7. The system of claim 1 or 2, further comprising at least one of:
a display unit;
an alphanumeric input device; and
a user interface navigation device.

8. The system of claim 1 or 2, wherein the overall comparative quality further depends upon global texture quality information, and the global texture quality information depends upon distributions of natural scene statistics.

9. The system of claim 1, wherein the plurality of base images comprise a plurality of reconstructed images generated, at least in part, from partial Fourier transforms of the input image.

10. The system of claim 2, wherein the reconstructed images are generated, at least in part, from partial Fourier transforms of the input image.

11. The system of claim 2, wherein the instructions to eliminate any parameter candidates that are suboptimal comprise instructions to:
calculate a quality prediction index for each of the parameter candidates;
determine whether each quality prediction index remains positive or negative over a predetermined number of iterations; and
eliminate any parameter candidates whose quality prediction index remains positive or negative over the predetermined number of iterations.

12. The system of claim 2, wherein the instructions to eliminate any parameter candidates that are suboptimal comprise instructions to:
calculate a quality prediction index for each of the parameter candidates;
calculate a global texture quality prediction for each of the parameter candidates;
determine whether each quality prediction index remains positive or negative over a predetermined number of iterations;
determine whether each global texture quality prediction remains positive or negative over the predetermined number of iterations; and
eliminate any parameter candidates whose quality prediction index and global texture quality prediction both remain positive or negative over the predetermined number of iterations.

13. The system of claim 2, wherein the weighted combination uses weights based on a smoothness index of total variances between patches of images being compared.

14. A method for automatically assessing and restoring quality of a digital image, comprising:
receiving an input image;
receiving a predetermined number of parameter candidates;
generating a reconstructed image from the input image for each parameter candidate;
sorting the reconstructed images by overall comparative qualities between pairs of the reconstructed images in the sorting, the overall comparative qualities representing a weighted combination of comparative quality indices, and determining the best reconstructed image, the best reconstructed image being a reconstructed image sorted highest by the overall comparative qualities;
calculating the overall comparative qualities between each remaining reconstructed image and the best reconstructed image;
eliminating any parameter candidates that are suboptimal based on the calculated overall comparative quality;
iteratively generating and sorting additional reconstructed images and eliminate suboptimal parameter candidates until each of the remaining parameter candidates is converged; and
outputting at least one of: the converged parameter candidates for use in image restoration or one or more reconstructed images whose parameter candidates converged, wherein overall comparative quality depends upon local gradient-based structure information, and the local gradient-based structure information depends upon differences between images being compared.

15. The method of claim 14, wherein the converged parameters are output using a communications network.

16. The method of claim 14, wherein the reconstructed images are generated, at least in part, from partial Fourier transforms of the input image.

17. The method of claim 14, wherein eliminating any parameter candidates that are suboptimal comprises:
    calculating a quality prediction index for each of the parameter candidates;
    determining whether each quality prediction index remains positive or negative over a predetermined number of iterations; and
    eliminating any parameter candidates whose quality prediction index remains positive or negative over the predetermined number of iterations.

18. The method of claim 14, wherein eliminating any parameter candidates that are suboptimal comprises:
    calculating a quality prediction index for each of the parameter candidates;
    calculating a global texture quality prediction for each of the parameter candidates;
    determining whether each quality prediction index remains positive or negative over a predetermined number of iterations;
    determining whether each global texture quality prediction remains positive or negative over the predetermined number of iterations; and
    eliminating any parameter candidates whose quality prediction index and global texture quality prediction both remain positive or negative over the predetermined number of iterations.

19. The method of claim 14, wherein determining the best reconstructed image comprises:
    selecting a plurality of key images from the reconstructed images and the additional reconstructed images based on a minimum mean squared difference of each reconstructed image as compared to a predetermined threshold; and
    selecting the best key image from the plurality of key images using a sorting algorithm, the best key image being the key image sorted highest by the overall comparative qualities,
    wherein sorting the reconstructed images by overall comparative qualities comprises comparing overall comparative qualities between each reconstructed image and at least one of the plurality of key images.

20. The method of claim 14, wherein the overall comparative quality further depends upon global texture quality information, and the global texture quality information depends upon distributions of natural scene statistics between images being compared.

* * * * *